United States Patent
Codrescu et al.

(10) Patent No.: US 9,678,758 B2
(45) Date of Patent: Jun. 13, 2017

(54) COPROCESSOR FOR OUT-OF-ORDER LOADS

(71) Applicant: QUALCOMM Incorporated, San Diego, CA (US)

(72) Inventors: Lucian Codrescu, Austin, TX (US); Christopher Edward Koob, Round Rock, TX (US); Eric Wayne Mahurin, Austin, TX (US); Suresh Kumar Venkumahanti, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 272 days.

(21) Appl. No.: 14/499,044

(22) Filed: Sep. 26, 2014

(65) Prior Publication Data
US 2016/0092238 A1    Mar. 31, 2016

(51) Int. Cl.
*G06F 9/312*    (2006.01)
*G06F 15/76*    (2006.01)
*G06F 15/80*    (2006.01)
*G06F 9/38*    (2006.01)
*G06F 9/30*    (2006.01)

(52) U.S. Cl.
CPC ........ *G06F 9/3877* (2013.01); *G06F 9/30036* (2013.01); *G06F 9/3814* (2013.01); *G06F 9/30043* (2013.01); *G06F 9/3824* (2013.01); *G06F 9/3836* (2013.01); *G06F 9/3887* (2013.01); *G06F 15/8053* (2013.01)

(58) Field of Classification Search
CPC .. G06F 9/3877; G06F 15/8053; G06F 9/3814; G06F 9/3836; G06F 9/30036; G06F 9/30043; G06F 9/3887; G06F 9/3824

USPC ............................................... 712/3, 34, 200
See application file for complete search history.

(56) References Cited

U.S. PATENT DOCUMENTS

| | | | | |
|---|---|---|---|---|
| 5,881,307 | A * | 3/1999 | Park | G06F 9/3816 710/21 |
| 6,553,482 | B1 * | 4/2003 | Witt | G06F 9/3814 712/214 |
| 6,647,485 | B2 | 11/2003 | Nguyen et al. | |
| 7,287,150 | B2 | 10/2007 | Yoshida | |
| 7,543,133 | B1 * | 6/2009 | Scott | G06F 12/0813 711/147 |

(Continued)

FOREIGN PATENT DOCUMENTS

WO    2013095401 A1    6/2013

*Primary Examiner* — Daniel Pan
(74) *Attorney, Agent, or Firm* — Muncy, Geissler, Olds & Lowe

(57) ABSTRACT

Systems and methods for implementing certain load instructions, such as vector load instructions by cooperation of a main processor and a coprocessor. The load instructions which are identified by the main processor for offloading to the coprocessor are committed in the main processor without receiving corresponding load data. Post-commit, the load instructions are processed in the coprocessor, such that latencies incurred in fetching the load data are hidden from the main processor. By implementing an out-of-order load data buffer associated with an in-order instruction buffer, the coprocessor is also configured to avoid stalls due to long latencies which may be involved in fetching the load data from levels of memory hierarchy, such as L2, L3, L4 caches, main memory, etc.

19 Claims, 4 Drawing Sheets

(56) References Cited

U.S. PATENT DOCUMENTS 8,032,734 B2 10/2011 Svendsen et al.
2012/0204005 A1 8/2012 Dockser et al.

* cited by examiner

COPROCESSOR FOR OUT-OF-ORDER LOADS

FIELD OF DISCLOSURE

Disclosed aspects are directed to processing systems where certain load instructions are offloaded from a main processor to a coprocessor. In some aspects the load instructions are committed in the main processor without receiving corresponding load data, and the load instructions are processed in the coprocessor, post-commit, to hide latencies incurred in fetching the load data.

BACKGROUND

Computer processors may support execution of instructions in a pipelined architecture in order to increase throughput. The processing of each instruction may be broken into a sequence of steps, such as instruction fetch, decode, execute, memory access, and write back. Each of these steps can be executed in one or more pipeline stages. Pipelining the instructions in this manner allows the processor to exploit instruction level parallelism. This increases overall processing speed; however, the overall latency of each instruction remains the same. For example, in the case of memory access instructions such as load instructions, long latencies may be involved for retrieving requested data from one or more levels of caches or main memory, which in some cases may be hundreds of clock cycles. Such long latencies for load instructions may introduce long stalls in the instruction pipeline if the instructions are being executed in program order (or "in-order" execution).

Accordingly, some processors may employ out-of-order execution, where instructions may execute and commit (e.g., exit the instruction pipeline after results of the instruction are written back to a register file) out of program order. For example, if a low latency arithmetic instruction enters the pipeline after a load instruction which would incur long latency to commit, then in-order processing would require the low latency arithmetic instruction to stall, waiting for processing of the long latency load instruction to be completed. In this example, in-order processing does not efficiently utilize the processor's resources. Instead, "out-of-order" processing may be implemented, where the low latency arithmetic instruction may be advanced or taken out-of-order to and processed before the processing of the long latency load instruction is completed. Out-of-order processing may be utilized for any number of instructions where they are reordered or processed out of program order in order to improve efficiency of the instruction pipeline. However, out-of-order execution may introduce complexities, for example, in cases where dependencies may exist between instructions that are reordered. Such dependencies may be data dependencies or control dependencies.

For example, a programmatically younger instruction (e.g., the low latency arithmetic instruction) may have one or more common operands with an older instruction (e.g., the long latency load instruction). If the younger instruction were to read or write one or more common operands before the older instruction has updated the operands, then a data hazard is created. Depending on the manner in which the data hazards are created, different forms of data hazards such as read-after-write (RAW), write-after-read (WAR), write-after-write (WAW), etc., are known in the art. Conventional approaches for detecting and preventing data hazards in out-of-order execution involve mechanisms such as scoreboarding, reorder buffers (ROBs), register alias tables (RATs), etc. These approaches rely on protocols such as Tomasulo's algorithm for register renaming and require specialized hardware for their implementation.

SUMMARY

Exemplary aspects of the invention are directed to systems and method for implementing out-of-order loads using a coprocessor, and avoiding latency and cost for implementing out-of-order loads within a main processor. For example, in some aspects, certain load instructions, such as vector load instructions are offloaded from the main processor to the coprocessor, after the load instructions are committed in the main processor without receiving corresponding load data. Post-commit, the load instructions are processed in the coprocessor, such that latencies incurred in fetching the load data are hidden from the main processor. By implementing an out-of-order load data buffer associated with an in-order instruction buffer, the coprocessor is also configured to avoid stalls due to long latencies which may be involved in fetching the load data from levels of memory hierarchy, such as L2, L3, L4 caches, main memory, etc.

Accordingly, an exemplary aspect is directed to a method of operating a processing system, the method comprising: identifying a first load instruction in a main processor for offloading to a coprocessor and committing the first load instruction in the main processor without receiving, by the main processor, first load data for satisfying the first load instruction. Processing of the first load instruction is offloaded to the coprocessor after the committing in the main processor.

Another exemplary aspect is directed to a processing system comprising a main processor and a coprocessor. The main processor configured to identify a first load instruction to offload to the coprocessor and commit the first load instruction in the main processor without receiving first load data for satisfying the first load instruction. The processing of the first load instruction is offloaded to the coprocessor post-commit.

Yet another exemplary aspect is directed to a processing system comprising means for identifying a first load instruction in a main processor for offloading to a coprocessor, means for committing the first load instruction in the main processor without receiving, by the main processor, first load data for satisfying the first load instruction, and means for processing of the first load instruction in the coprocessor, after the committing in the main processor.

Another exemplary aspect is directed to a non-transitory computer-readable storage medium comprising instructions executable by a processor, the processor in communication with a coprocessor, the non-transitory computer-readable storage medium comprising a first load instruction comprising a processor part and a coprocessor part, wherein the processor part is executable by the processor, such that the first load instruction is committed in the processor upon execution of the processor part processor, without receiving, by the processor, first load data for satisfying the first load instruction. The coprocessor part is executable by the coprocessor, such that the coprocessor part is executed in the coprocessor after the first load instruction is committed in the processor. In an example, the processor part is a scalar instruction and the coprocessor part is a vector instruction.

BRIEF DESCRIPTION OF THE DRAWINGS

The accompanying drawings are presented to aid in the description of aspects of the invention and are provided solely for illustration of the aspects and not limitation thereof.

DETAILED DESCRIPTION

Figure 1:
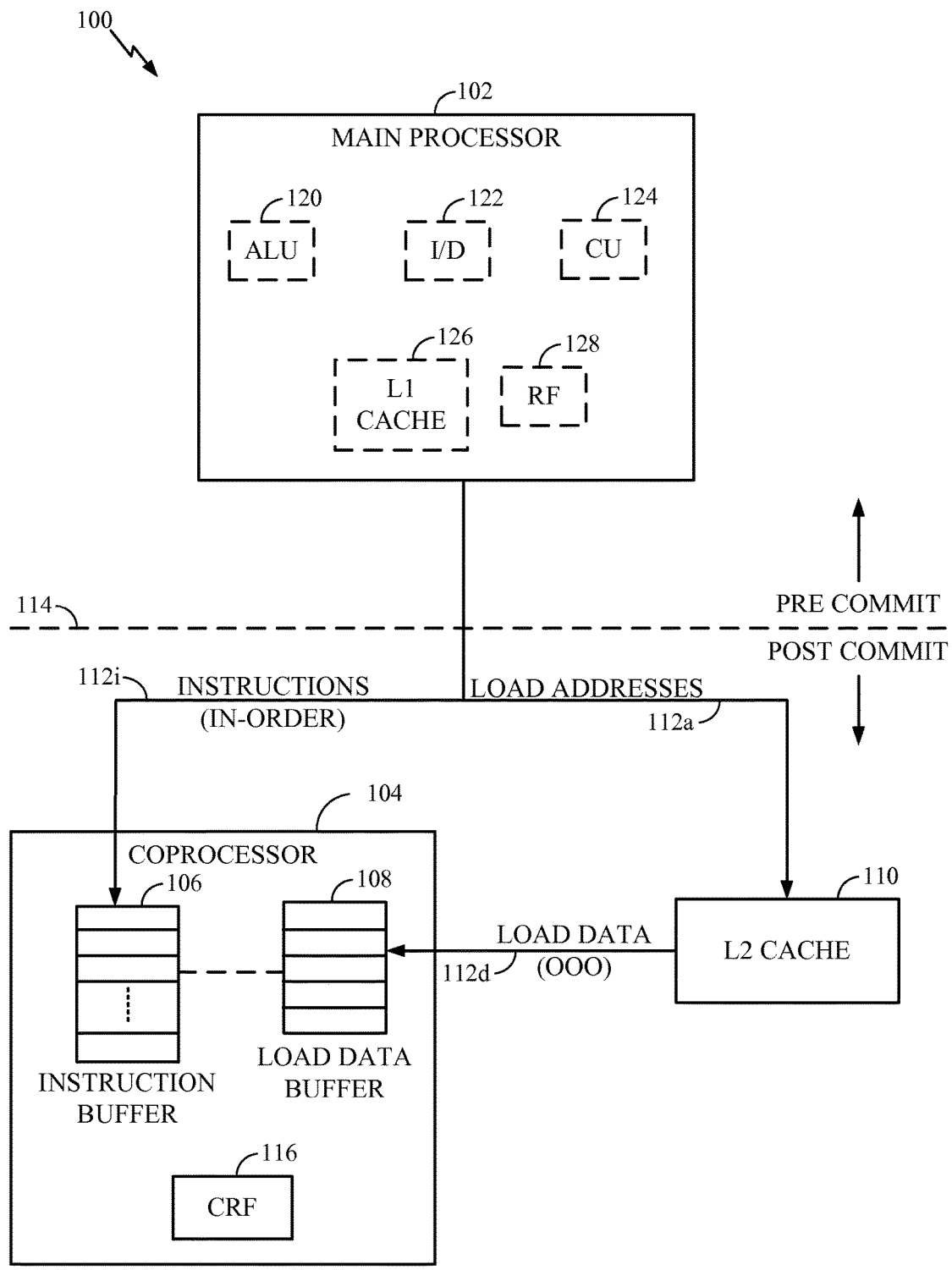
FIG. 1 illustrates a processing system configured according to exemplary aspects of this disclosure.

Aspects of the invention are disclosed in the following description and related drawings directed to specific aspects of the invention. Alternative aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Aspects of this disclosure relate to accelerating execution of certain load instructions without relying on mechanisms used in conventional out-of-order processing systems. More specifically, a main processor is configured to commit one or more exemplary load instructions before corresponding load data for the load instructions has been fetched. From the main processor's perspective, committing these load instructions signifies that processing of these load instructions is completed. These load instructions are then offloaded to a coprocessor after being committed in the main processor, or "post-commit," as referred to herein. Committing a load instruction in this manner allows the main processor to continue processing of a younger instruction which follows the load instruction in program order or "in-order" without having to stall the younger instruction for a long duration while waiting for the load instruction's load data to be fetched. Moreover, the main processor also avoids the need for out-of-order processing of the load instruction. Thus, the speed benefits of in-order execution can be achieved for at least the exemplary load instructions which are committed and offloaded to a coprocessor post-commit. From the perspective of the main processor, the processing of the exemplary load instructions is in-order. However, it will be noted that the main processor may be capable of processing other instructions out-of-order, without limitation.

In more detail, the main processor may include a main instruction pipeline which may support, without limitation, multithreaded processing, parallel processing, superscalar processing, vector processing (e.g., single instruction multiple data (SIMD)), etc. The main instruction pipeline may support in-order as well as out-of-order execution of instructions. The main processor may include one or more logical units such as an arithmetic and logical unit (ALU), a load/store unit, a register file, an instruction/data fetch unit, a control unit, etc., which support the main instruction pipeline. The main processor may also include an on-chip or local level-1 (L1) cache which may be a small-size fast cache.

The main processor may be configured to determine exemplary load instructions which may be offloaded to a coprocessor without waiting for corresponding load data to be fetched into a main register file, or the register file of the main processor. Fetching the load data for these load instructions may incur long latencies, as the load data may not be available in the L1 cache. (If the load data is available in the L1 cache, then fetching the load data would not incur significant delay, and the main processor may continue execution of the load instructions in a conventional manner). If the load data is not available in the L1 cache, the load data may need to be searched for in an off-chip level-2 (L2) cache, or a higher level cache (e.g., a level-3 or L3 cache) or main memory. In this disclosure, the term "memory hierarchy" is used to include the various higher level caches and main memory. Thus, in exemplary aspects, the memory hierarchy includes, for example, the L2, L3, L4 caches, main memory, and the like. Accordingly, searching for and retrieving the load data from the memory hierarchy may incur long latencies, and thus may introduce undesirable stalls in the main instruction pipeline.

In order to avoid such long latencies and associated complexity, in exemplary aspects, the main processor may commit the load instruction in the main instruction pipeline prior to the requested load data being fetched. In the context of this disclosure, "committing" the load instruction means that architectural states pertaining to the load instruction are updated to reflect that processing of the load instruction is complete. For example, one or more registers in the main processor's register file will be updated, and available for a younger instruction in the main processor to access, before the load data is fetched. This kind of register file update is possible in an exemplary load instruction, where, for example, the load instruction specifies a first register of the main register file of the main processor which holds an address from which load data is to be fetched, and a post-increment operation on the first register. In exemplary aspects related to processing such a load instruction, committing the load instruction means that the first register can be post-incremented (i.e., a constant value can be added to the first register) and the first register file can be updated with the post-incremented value of the first register without waiting for the load data from the address to be fetched. Processes related to fetching the load data from the address can be offloaded to a coprocessor, post-commit. Thus, from the main processor's perspective, processing of the load instruction is completed once the load instruction is committed. A program counter (PC) of the main processor can be incremented and a new instruction can enter the instruction pipeline.

The post-commit processing of the load instruction will now be explained. The post-commit processing is performed or managed by a coprocessor. Once the load instruction has been committed in the main processor, the load instruction is sent to the coprocessor. The coprocessor receives the various load instructions sent from the main processor in-order and implements an out-of-order completion path. In more detail, the coprocessor implements an in-order instruction buffer which stores the load instructions that are received from the main processor. Corresponding load addresses for the load data are sent to the L2 cache. The load data for each load instruction may become available at a different, non-determinate time (based on whether the load data is present in the L2 cache, and if not, whether the load data needs to be retrieved from a higher level cache or main memory). An out-of-order load data buffer is provided, which may be updated with load data as and when the load data is available. While the in-order instruction buffer in the coprocessor may store any instruction, there may be a one-to-one relationship between load instructions stored in the in-order instruction buffer and corresponding load data that gets placed in the out-of-order load data buffer. For example, for a first load instruction present in the in-order instruction buffer, there may be a corresponding data entry in the out-of-order load data buffer. When this corresponding data entry is populated with, for example, a first load data once the first load data is retrieved (e.g., from the L2 cache or another location in the memory hierarchy), the first load instruction can be retired. Retiring the load instructions in the coprocessor may mean that a separate, second register file in the coprocessor is updated with the load data. It will be appreciated that these processes performed in the coprocessor pertaining to retrieving the data and eventually retiring the load instruction are not visible to the main processor, or in other words, the main processor is not concerned with these post-commit operations of the load instruction.

In one example, the coprocessor may be configured to process vector instructions. Thus, the exemplary load instructions can be vector load instructions. However, it will be understood that this example is merely for the sake of illustration of the disclosed aspects, and not to be treated as limiting the scope of this disclosure to vector processors or vector loads. Exemplary aspects may be extended to processing any type of load instruction which can be committed in the main processor without waiting for corresponding load data to be fetched, where post-commit processes for fetching the load data can be performed out-of-order in a coprocessor.

Accordingly, with reference to FIG. 1, an exemplary processing system 100 is illustrated, which includes main processor 102 and coprocessor 104. Main processor 102 may support, without limitation, multithreaded processing, parallel processing, superscalar processing, vector processing (e.g., single instruction multiple data (SIMD)), scalar processing, etc. Main processor 102 may be configured to implement a pipelined operation in a main instruction pipeline (not explicitly shown) with pipeline stages such as instruction fetch, decode, execute, memory access, and write back. Instructions may be fetched and dispatched to one or more logical units such as ALU 120, instruction/data processing unit ID 122, control unit (CU) 124, etc. The logical units may retrieve operands related to instruction processing from the main register file (RF) 128 and update RF 128 at the write back or commit stage of the main instruction pipeline. Main processor 102 may include L1 cache 126, which may be a fast, small-sized on-chip cache located on a same chip as main processor 102.

Main processor 102 can be configured to process some load instructions in a conventional manner, in addition to being configured to process exemplary load instructions. For example, some conventional load instructions encountered by main processor 102 can be serviced by L1 cache 126, and these are not offloaded to coprocessor 104. In a non-limiting example where coprocessor 104 is a vector processor, vector load instructions may belong to one or more types of exemplary load instructions which are offloaded to coprocessor 104, and non-vector or scalar load instructions may be conventional load instructions that are handled by main processor 102 in a conventional manner. In another non-limiting example, coprocessor 104 may be configured to handle processing of floating point numbers whereas main processor 102 may handle processing of fixed point numbers. Correspondingly, load instructions pertaining to floating point operations may be offloaded to coprocessor 104, whereas loads pertaining to fixed point operations may be handled by main processor 102 in a conventional manner. Thus, in these non-limiting examples, main processor 102 may process the conventional load instructions either in-order or out-of-order, without limitation, by accessing L1 cache 126, and if there is a miss, accessing L2 cache 110 or a higher level cache or main memory to fetch corresponding load data. An exhaustive description for conventional processing of conventional load instructions such as the scalar load instructions is beyond the scope of this disclosure and, as such, will be avoided.

On the other hand, exemplary load instructions which may be processed according to aspects of this disclosure will now be described in further detail. Main processor 102 may identify exemplary load instructions such as vector load instructions which can be offloaded to coprocessor 104, in the example where coprocessor 104 may be configured to handle vector operations or vector processing. These exemplary load instructions will be generally referred to as "coprocessor load instructions," to distinguish them from conventional load instructions such as the scalar instructions mentioned above. Main processor 102 may process the coprocessor load instructions in-order and commit them in main processor 102 before load data for the coprocessor load instructions are fetched. In this regard, main processor 102 may update architectural states and RF 128 to reflect that the coprocessor load instruction has been completed and committed. The coprocessor load instruction is offloaded to coprocessor 104 for processing, post-commit. A program counter (PC) for main processor 102 may be incremented to continue processing instructions in the main processor.

A conceptual dividing line 114 illustrates a separation between pre-commit and post-commit stages for an example coprocessor load instruction. In the post-commit stage, coprocessor load instructions are offloaded from main processor 102 to coprocessor 104. Coprocessor 104 may include instruction buffer 106, load data buffer 108 and coprocessor register file (CRF) 116. As previously indicated, coprocessor 104 may be a special purpose processor such as a vector processor, floating point processor, a digital signal processor, etc. Accordingly, coprocessor 104 may also receive other instructions related to the processes implemented by coprocessor 104, and as such, coprocessor 104 may not be limited to only the coprocessor load instructions received from main processor 102. For example, in the case where coprocessor 104 is a vector processor, coprocessor 104 may receive one or more vector instructions from main processor 102, in addition to vector load instructions. In such cases, CRF 116 may be configured as a vector register file.

A first load instruction may be recognized as a coprocessor load instruction by main processor 102, for example, based on its operation code (op-code). Main processor 102 may process the first load instruction within its main instruction pipeline in the pre-commit stage (shown above line 114) until the first load instruction is committed in main processor 102. In other words, in the pre-commit stage, main processor 102 may update RF 128 pertaining to the first load instruction, and update the program counter (PC) of main processor 102 to move on to processing a next instruction. Post-commit (shown below line 114), main processor 102 is no longer concerned with the first load instruction. To be clear, once the load data for the first load instruction is fetched in the post-commit stage, the load data is not supplied to main processor 102, and no further updates of architectural states or registers of RF 128 take place in main processor 102.

In the post-commit stage, the first load instruction is provided over the bus denoted coprocessor instructions 112*i* to instruction buffer 106. As previously mentioned, coprocessor 104 may also receive one or more other coprocessor instructions (either from main processor 102 or from any other source), and these one or more other coprocessor instructions may also be stored in instruction buffer 106. Instruction buffer 106 may be an in-order buffer with one or more entries. In an example, the first load instruction may be stored in a first entry of instruction buffer 106.

In parallel to storing the first load instruction, a first address for the first load instruction is sent on the bus denoted load addresses 112*a* to L2 cache 110. However, time taken to retrieve corresponding first load data from L2 cache 110 may be indeterminate, and in some cases may involve significant latency. In other words, the return path for data retrieved from L2 cache 110 may be out-of-order (OOO) and may depend on whether or not the first load data is present in L2 cache 110, for example. Thus, load data buffer 108 is implemented as an OOO buffer. Entries of load data buffer 108 may have correspondence to entries of instruction buffer 106 which hold load instructions. For example, a first entry of load data buffer 108 is designated to correspond to the first entry of instruction buffer 106 which holds the first load instruction. A second load instruction which follows the first load instruction may be stored in a second entry of in-order instruction buffer 106, and a corresponding second entry of load data buffer 108 may be designated to correspond to the second entry of instruction buffer 106 which holds the second load instruction. In this example, the second load instruction may not be dependent on the first load instruction, and may merely be a programmatically younger instruction in the instruction pipeline of main processor 102.

Thus, as and when the first load data for the first load instruction becomes available, it is forwarded on the bus denoted load data 112*d*, to load data buffer 108. The first entry of load data buffer 108 is populated with the first load data. Similarly, the second entry of load data buffer 108 may be populated with a second load data for the second load instruction, as and when the second load data becomes available. However, the second load data may become available earlier than when the first load data becomes available, even though the second load instruction follows the first load instruction. Since load data buffer 108 is an OOO buffer, it allows for population of the first load data and the second load data out-of-order, i.e., in this case, populating the second entry of data buffer 108 with the second load data prior to population of the first entry of data buffer 108 with the first load data.

Once the first entry of load data buffer 108 is thus populated with the first load data, the first load instruction can be retired in coprocessor 104. For example, CRF 116 may be updated with the value of the first load data. Accordingly, the latency involved with retrieving the first load data for the first load instruction is hidden from main processor 102. By committing and transferring the first load instruction, post-commit, to coprocessor 104 in the above-described manner, main processor 102 need not implement complex logic or suffer from stalls while waiting for the first load data to become available.

From the above description, it will also be understood that coprocessor 104 need not implement all of the above-described functionality. For example, although instruction buffer 106 and load data buffer 108 have been illustrated within coprocessor 104, it is not a requirement for either one of these units to be part of coprocessor 104. As such, either one or both of instruction buffer 106 and load data buffer 108 may be standalone units.

Figure 2:
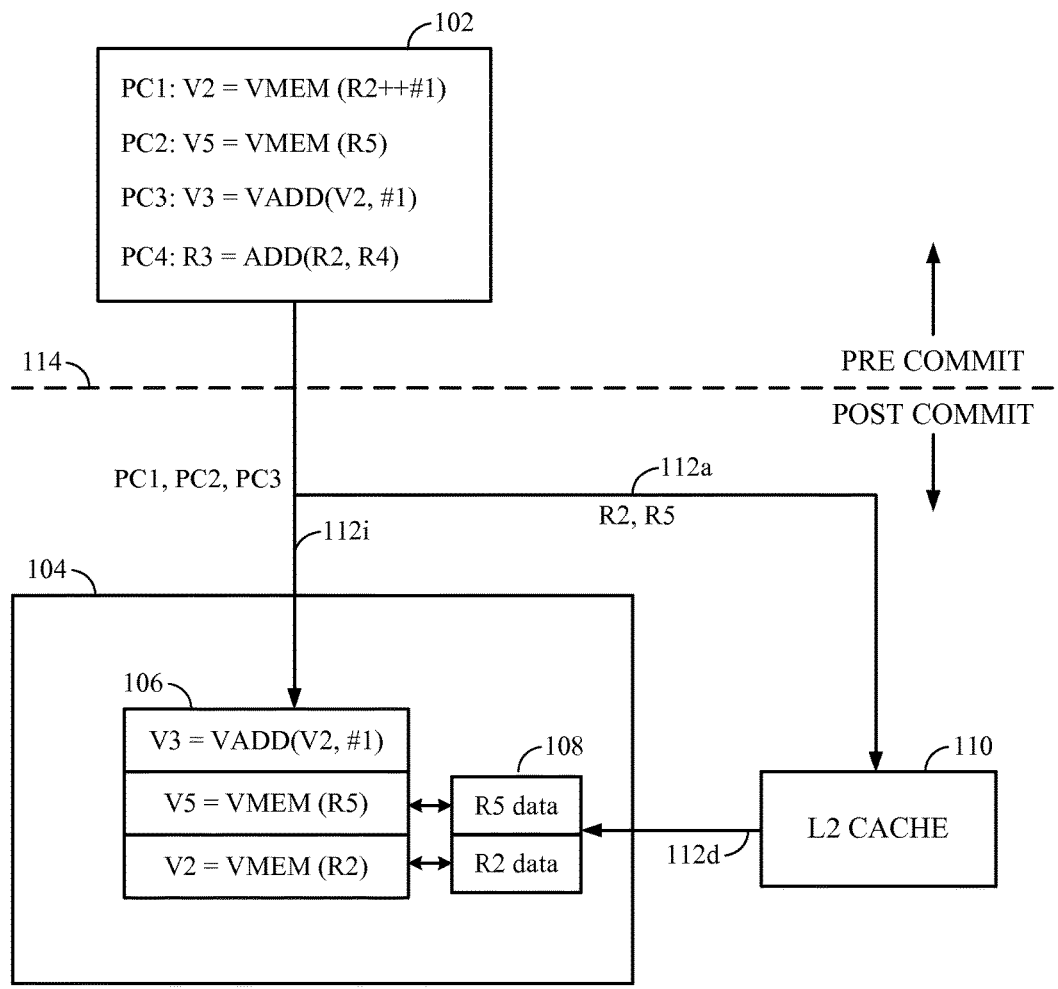
FIG. 2 illustrates exemplary processing of a load instruction according to aspects of this disclosure.

With reference to FIG. 2, an illustrative example is provided for the exemplary processing of a coprocessor load instruction. FIG. 2 depicts exemplary handling of a pseudo code snippet within the above-described framework of FIG. 1 (reference numerals from FIG. 1 have been retained in FIG. 2 for ease of description). Accordingly in FIG. 2, the above-described first load instruction is a vector load instruction encountered at a program counter (PC) value representatively shown as PC1. This first load instruction is shown in pseudo code as V2=VMEM (R2++#1), with a two-part behavior—a first part is to load a vector register V2 with the data obtained from an address specified in register R2 (this may also be referred to as a "vector part" of the first load instruction in this specific example, and in a general case, as a "coprocessor part") and a second part is to post-increment R2 (this may also be referred to as a "scalar part" of the first load instruction in this specific example, and in a general case, a "processor part" or a "main processor part"). In more detail, V2 can be a register of a register file in a coprocessor, such as CRF 116. R2 can be a register of RF 128 of main processor 102. According to the instruction's semantics, the scalar part involves the value of R2 to be incremented or added to a constant value "1" after the vector part involving the vector load instruction VMEM has been performed, i.e., after the first load data at the first address held in R2 has been fetched. The vector register V2 is to be updated with this first load data after it has been fetched.

Similarly at PC2, an example of the above-described second load instruction is shown in pseudo code as V5=VMEM (R5). In contrast to the first load instruction, the second load instruction is shown to have only a vector or coprocessor part, where vector register V5 of CRF 116 is to be loaded with second load data obtained from a second load address specified in register R5 (R5 can also be a register of RF 128 of main processor 102). For the purposes of this example, the second load instruction has not shown to be dependent on the first load instruction, but is merely a programmatically younger instruction than the first load instruction.

For the first and second load instructions, the addresses specified by R2 and R5 may not be available in L1 cache 126. Thus, L2 cache 110 (or a higher level cache or main memory) may need to be accessed in order to locate the first and second addresses and retrieve the corresponding first and second load data. These processes may involve a long latency, and waiting for the first and second load data to be retrieved may create stalls.

For example, if a third instruction at PC3: V3=VADD (V2, #1), which is a vector instruction, follows the first and second load instructions at PC1 and PC2 as shown, where the third instruction is dependent on the first load data, then the third instruction at PC3 may also need to be stalled until the vector/coprocessor part of the first load instruction is completed, the first load data is fetched and the value of the vector register V2 is updated.

Further, if a fourth instruction at PC4: R3=ADD (R2, R4)), which is a scalar instruction and which is also dependent on the first load instruction follows the first load instruction, then the fourth instruction may also be stalled, but in this case, until the scalar/main processor part of the first load instruction is completed and the value of R2 is updated (i.e., post-incremented).

In processing the above set of instructions PC1-PC4, rather than wait for the vector part of the first load instruction to complete (i.e., when the first load data will be retrieved) in order to perform the scalar part (i.e., when the update or post-increment of R2 is performed), exemplary processing of the first load instruction (PC1: V2=VMEM (R2++#1)) involves splitting up the processing of the first load instruction into a pre-commit stage (scalar/main processor part) and a post-commit stage (vector/coprocessor part). In the pre-commit stage, the first load instruction, may be identified as a vector load instruction for offloading to coprocessor 104. Main processor 102 performs the scalar/main processor part by reading the value of R2 from RF 128 and incrementing the value in R2 by the immediate or constant numerical value "1," without waiting for completion of the vector part involving the first load data in the first address held in R2 to be fetched. Once R2 is incremented in this manner, the scalar/main processor part is completed and the first load instruction PC1: V2=VMEM (R2++#1) is committed in main processor 102. Main processor 102 then increments its PC value to process the second load instruction at PC2. In the case of the second load instruction, the pre-commit stage may simply involve identifying the second load instruction as a vector load instruction for offloading to coprocessor 104, without there being a scalar part for the second load instruction.

In the post-commit stage handled by coprocessor 104, processing of the vector/coprocessor parts of the first and second load instruction take place. In more detail, for the first load instruction, in the post-commit stage, a first load address which was held in R2 (prior to incrementing its value) is provided to L2 cache 110 via the bus load addresses 112a. A queuing mechanism or buffer (not shown) may be utilized for forwarding the original values in R2 and the corresponding instructions to coprocessor 104. Thus, the vector/coprocessor part of the first load instruction for loading vector register V2 with the first load data (representatively shown as V2=VMEM (R2)) is sent to in-order instruction buffer 106 over the bus, coprocessor instructions 112i and placed in a first entry of in-order instruction buffer 106, for example. At this point, the processing of the vector/coprocessor part of the first load instruction waits until the first load data is retrieved from L2 cache 110 via the bus, load data 112d, and placed in a corresponding first entry of load data buffer 108.

On similar lines, for the second load instruction, in the post-commit stage, the second load address held in R5 is provided to L2 cache 110 via the bus load addresses 112a. Thus, the second load instruction for loading vector register V5 with the second load data (V5=VMEM (R5)) is sent to in-order instruction buffer 106 from the bus, coprocessor instructions 112i and placed in a second entry of in-order instruction buffer 106, for example. At this point, the processing of the second load instruction also waits until the second load data is retrieved from L2 cache 110 via load data 112d and placed in a second entry of load data buffer 108, for example.

As previously described, load data buffer 108 may be out-of-order. In this example, the second load data may become available sooner than the first load data becomes available. This may happen, for example, if there is a hit for the second load address in L2 cache 110, but due to a miss for the first load address in L2 cache 110, the search for the second load address may need to be extended to other levels in the memory hierarchy. Therefore, the second entry of load data buffer 108 may get populated with the second load data (representatively shown as "R5 data") before the first entry gets populated with the first load data (representatively shown as "R2 data"). Once the second entry is populated in this manner, the second entry of out-of-order load data buffer 108 is associated with the corresponding second entry of in-order instruction buffer 106, and processing of the second load instruction may now be treated as being completed within coprocessor 104. Accordingly, processing of the second load instruction may be completed, whereby the value of the vector register V5 is updated in CRF 116 with the second load data, while processing of the first load instruction is still pending completion.

Returning to the first load instruction, while the processing of the vector/coprocessor part of the first load instruction is still pending in the post-commit stage, main processor 102 may also send the third instruction PC3: V3=VADD (V2, #1) to coprocessor 104, since this is a vector instruction (e.g., via the bus, coprocessor instructions 112i to be placed in a third entry in instruction buffer 106). As previously noted, in this case, the third instruction has a data dependency on the first load instruction, but the processing of the third instruction is now hidden from main processor 102.

While the processing of the first load instruction, the second load instruction, and the third instruction have been offloaded and are being handled in coprocessor 104, main processor 102 may move on to processing the fourth instruction. The fourth instruction PC4: R3=ADD (R2, R4) has a data dependency on the first load instruction. However, this data dependency does not require the first load data pending completion of the vector/coprocessor part of the first load instruction, but can be satisfied merely based on completion of the scalar/main processor part of the first instruction, wherein the post-incremented value of R2 is already available in main processor 102. Thus, the fourth instruction is processed in program order to perform an add operation on the post-incremented and updated value of register R2 with a value from another register R4 of RF 128 (assuming R4 is available without any data dependencies or delays, for the purposes of this description).

Returning once again to the processing of the first load instruction in coprocessor 104, once the first load data becomes available after several cycles of latency incurred in accessing L2 cache 110 (or the next level of memory hierarchy), the first entry in load data buffer 108 is updated out of order with the first load data. For example, the first entry of load data buffer 108 may be updated several clock cycles after the second entry of load data buffer 108 was updated with the second load data. At this point in time when the first entry of load data buffer 108 gets updated, it gets associated with the vector/coprocessor part of the first load instruction, V2=VMEM (R2), located in the first entry in instruction buffer 106. Processing of the vector/coprocessor part of the first load instruction can now be completed, whereby the value of the vector register V2 is updated in CRF 116 with the first load data. Once V2 is updated, the third instruction PC3: V3=VADD (V2, #1) which was stored in the third entry in instruction buffer 106 can also be completed immediately thereafter, whereby the value of the vector register V3 in CRF 116 can be updated with an immediate or constant numerical value "1" added to the updated value in vector register V2.

In this manner, coprocessor 104 also avoids any stalls that may be introduced in between the first load instruction and the third instruction. In more detail, coprocessor 104 processes instructions in the order their corresponding data values become available. Thus, coprocessor 104 would have been able to process other instructions from instruction buffer 106 as and when they were ready (e.g., their data or source operands were available), and thus, there would have been no stalls introduced while the first load instruction was waiting for its first load data to become available. For example, as described for the second load instruction, coprocessor 104 was able to process the second load instruction at PC2 which does not have a dependency on the first load instruction at PC1, when the second load data became available prior to the first load data becoming available.

Figure 3:
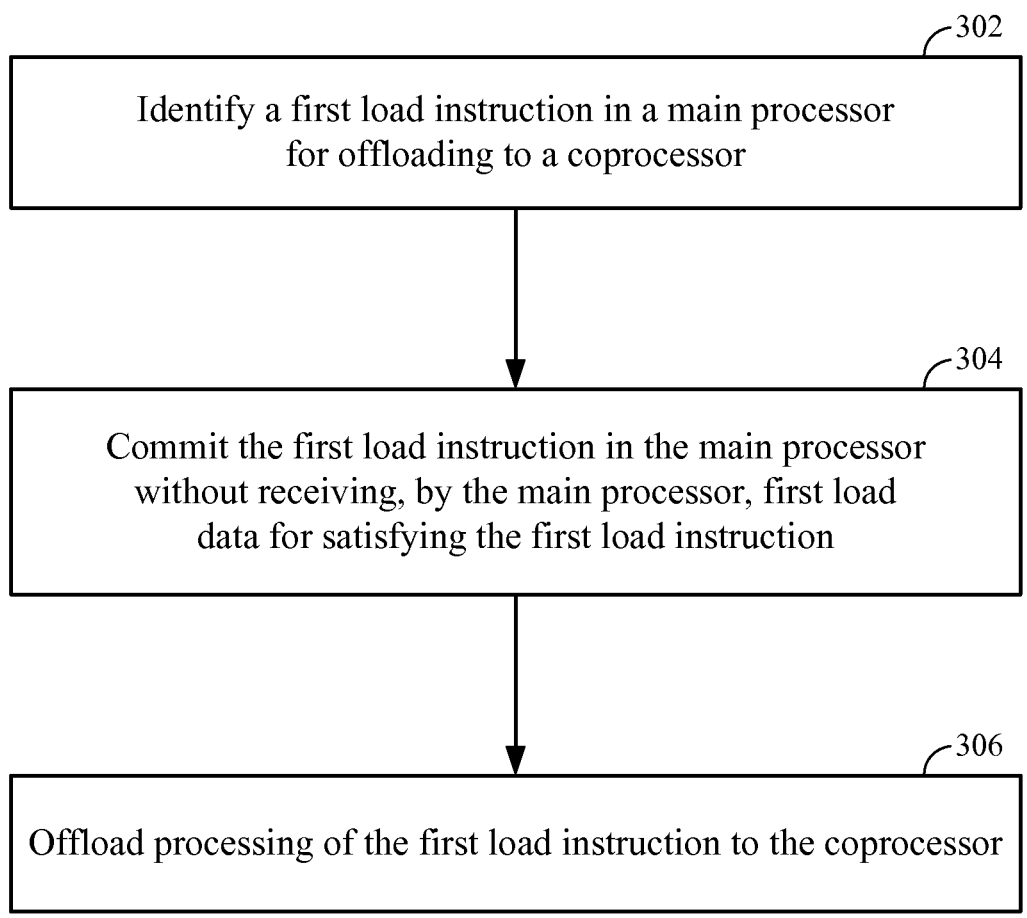
FIG. 3 illustrates a flow-chart for a method of executing exemplary load instructions based on a cooperation of a main processor and a coprocessor, according to aspects of this disclosure.

Accordingly, it will be appreciated that aspects include various methods for performing the processes, functions and/or algorithms disclosed herein. For example, as illustrated in FIG. 3, an aspect can include a method of operating a processing system (e.g., 100).

In Block 302, the method comprises identifying a first load instruction (e.g., PC1) in a main processor (e.g., 102) for offloading (e.g., via bus, 112*i*) to a coprocessor (e.g., 104). For example, the main processor may be configured to determine that the first load instruction may be offloaded to the coprocessor without waiting for corresponding first load data to be fetched into a register file of the main processor. Fetching the first load data for the first load instruction may incur long latencies incurred due to accessing a memory hierarchy comprising L2, L3, L4 caches, main memory, etc., as the first load data may not be available in an L1 cache of the main processor, for example.

Accordingly, the method involves, in Block 304, committing the first load instruction in the main processor (e.g., by updating register file RF 128 of main processor 102) without receiving, by the main processor, first load data (e.g., via bus 112*d* from L2 cache 110) for satisfying the first load instruction. For example, one or more registers in the main processor's register file may be updated, and available for a younger instruction (e.g., PC2, PC3, PC4) in the main processor's instruction pipeline to access, before the first load data is fetched. This kind of register file update is possible, where, for example, the first load instruction specifies a register (e.g., R2 of RF 128) which holds an address from which load data is to be fetched, and a post-increment operation on the register. In exemplary aspects related to processing the first load instruction, committing the first load instruction means that the register can be post-incremented (i.e., a constant value can be added to the register) and the register file can be updated with the post-incremented register value, without waiting for the first load data from the address to be fetched.

In Block 306, the method comprises offloading processing of the first load instruction to the coprocessor. The offloading to the coprocessor is post-commit, which from the main processor's perspective, means that processing of the first load instruction is completed once the first load instruction is committed. A program counter (PC) of the main processor can be incremented and a new instruction (e.g., PC2, PC3, PC4, etc.) can enter the main processor's instruction pipeline. The post-commit processing of the first load instruction in the coprocessor can include accessing the memory hierarchy with the first load address for the first load instruction, and receiving the first load data corresponding to the first load address from the memory hierarchy. In the coprocessor, the first load instruction may be associated with the first load data out of program order, for example, by storing the first load instruction in program order in a first entry of an in-order instruction buffer (e.g., 106), and storing the first load data received from the memory hierarchy in a first entry of an out-of-order load data buffer (e.g., 108). Associating the first load instruction with the first load data may be based on determining that the first entry of the load data buffer corresponding to the first entry of the load instruction buffer has been populated. In exemplary aspects, the coprocessor may be a vector processor and the first load instruction may be a vector load instruction.

Further, it will also be appreciated that exemplary aspects include means for performing the exemplary functions described. For example, an exemplary processing system (e.g., 100 of FIG. 1) includes means for identifying (e.g., in an instruction pipeline of main processor 102) a first load instruction (e.g., PC1) in a main processor for offloading (e.g., via bus 112*i*) to a coprocessor (e.g., 104). The processing system further includes means for committing (e.g., based on update of register file RF 128) the first load instruction in the main processor without receiving, by the main processor, first load data (e.g., from bus 112*d*) for satisfying the first load instruction, and means for processing (e.g., in-order instruction buffer 106, out-of-order load data buffer 108, and coprocessor register file CRF 116) of the first load instruction in the coprocessor, after the committing in the main processor. In more detail, the coprocessor may include means for accessing a memory hierarchy (e.g., L2 cache 112) with a first load address (e.g., from bus 112*a*) for the first load instruction, means for receiving a first load data (e.g., from bus 112*d*) corresponding to the first load address from the memory hierarchy (e.g., out-of-order, to be stored in a first entry of the out-of-order load data buffer 108), and means for associating (e.g., association of a first entry of in-order instruction buffer 106 comprising the first load instruction with the first entry of the out-of-order load data buffer 108) the first load instruction with the first load data out of program order.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Figure 4:
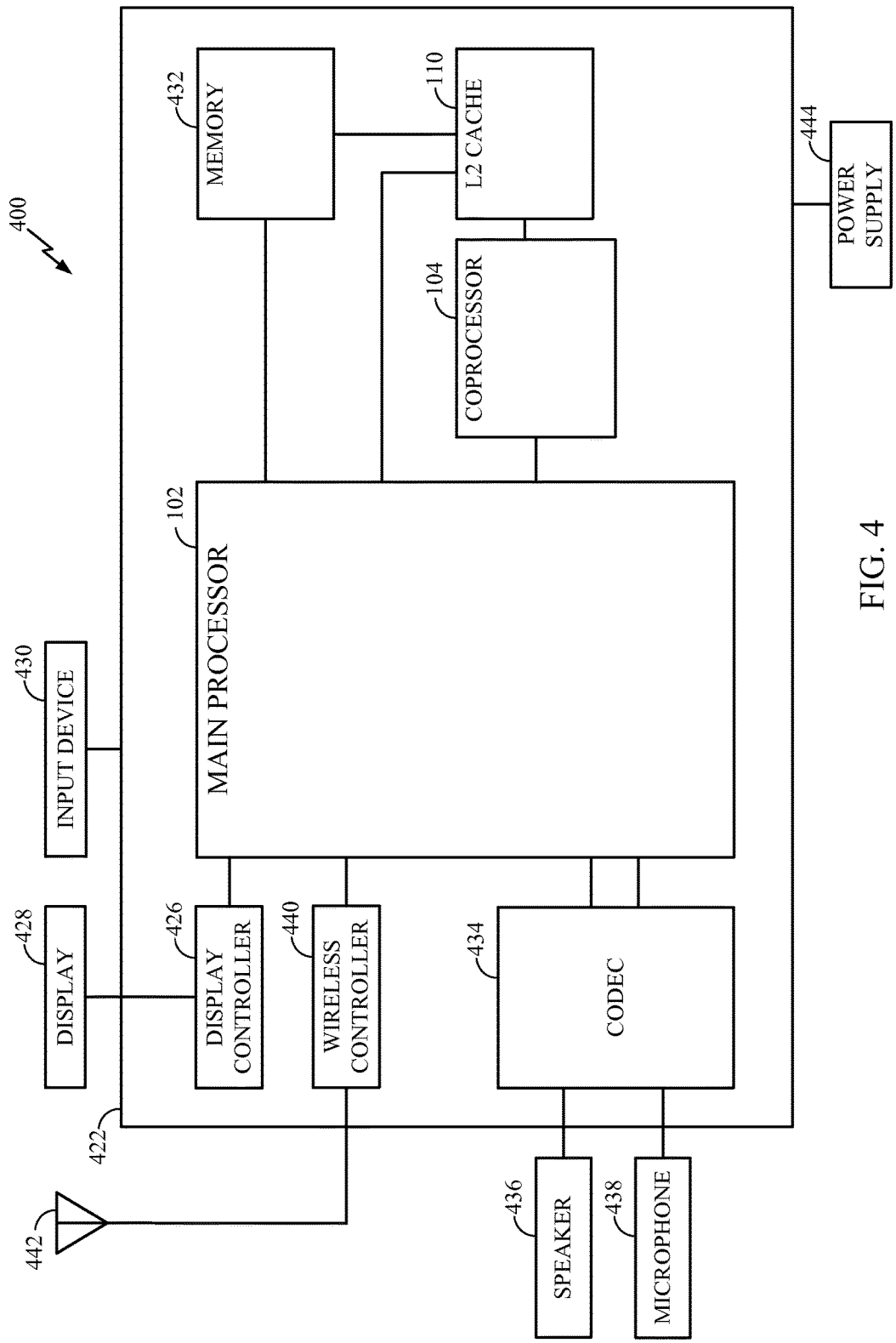
FIG. 4 illustrates an exemplary wireless device 400 in which an aspect of the disclosure may be advantageously employed.

Referring to FIG. 4, a block diagram of a particular illustrative aspect of wireless device 400 according to exemplary aspects. Wireless device 400 includes previously described main processor 102 which may be in communication with coprocessor 104. As shown in FIG. 1, coprocessor 104 may be configured to access L2 cache 110. L2 cache 110 may be in communication with memory 432 as well as with main processor 102. FIG. 4 also shows display controller 426 that is coupled to main processor 102 and to display 428. Coder/decoder (CODEC) 434 (e.g., an audio and/or voice CODEC) can be coupled to main processor 102. Other components, such as wireless controller 440 (which may include a modem) are also illustrated. Speaker 436 and microphone 438 can be coupled to CODEC 434. FIG. 4 also indicates that wireless controller 440 can be coupled to wireless antenna 442. In a particular aspect, main processor 102, coprocessor 104, L2 cache 110, display controller 426, memory 432, CODEC 434, and wireless controller 440 are included in a system-in-package or system-on-chip device 422.

In a particular aspect, input device 430 and power supply 444 are coupled to the system-on-chip device 422. Moreover, in a particular aspect, as illustrated in FIG. 4, display 428, input device 430, speaker 436, microphone 438, wireless antenna 442, and power supply 444 are external to the system-on-chip device 422. However, each of display 428, input device 430, speaker 436, microphone 438, wireless antenna 442, and power supply 444 can be coupled to a component of the system-on-chip device 422, such as an interface or a controller.

It should be noted that although FIG. 4 depicts a wireless communications device, main processor 102, coprocessor 104, and memory 432 may also be integrated into a set-top box, a music player, a video player, an entertainment unit, a navigation device, a personal digital assistant (PDA), a fixed location data unit, or a computer. Further, at least one or more exemplary aspects of wireless device 400 may be integrated in at least one semiconductor die.

Accordingly, an aspect can include a computer readable media embodying a method for processing load instructions in a processor and a coprocessor. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of operating a processing system, the method comprising:
identifying a first load instruction in a main processor for offloading to a coprocessor;
committing the first load instruction in the main processor without receiving, by the main processor, first load data for satisfying the first load instruction, wherein committing the first load instruction comprises completing a main processor part of the first load instruction by updating a first register specified in the first load instruction, in a main register file in the main processor; and
offloading processing of the first load instruction to the coprocessor after the committing in the main processor.

2. The method of claim 1, wherein committing the first load instruction comprises updating a program counter (PC) value of the main processor.

3. The method of claim 1, wherein processing the first load instruction in the coprocessor comprises:
accessing a memory hierarchy with a first load address for the first load instruction;
receiving a first load data corresponding to the first load address from the memory hierarchy; and
associating the first load instruction with the first load data out of program order.

4. The method of claim 3, further comprising:
storing the first load instruction in program order in a first entry of an in-order instruction buffer; and
storing the first load data received from the memory hierarchy in a first entry of an out-of-order load data buffer,
wherein associating the first load instruction with the first load data comprises completing a coprocessor part of the first load instruction by determining that the first entry of the load data buffer corresponding to the first entry of the load instruction buffer has been populated.

5. The method of claim 4, further comprising:
storing a second load instruction offloaded from the main processor in a second entry of the in-order buffer, wherein the second load instruction is programmatically younger than the first load instruction;
receiving second load data corresponding to the second load instruction from the memory hierarchy, prior to receiving the first load data; and
storing the second load data in a second entry of the out-of-order load data buffer prior to storing the first load data in the first entry of the out-of-order load data buffer.

6. The method of claim 4, further comprising:
storing a third instruction offloaded from the main processor in a third entry of the in-order buffer, wherein the third instruction has a data dependency on the first load instruction; and
executing the third instruction in the coprocessor based on the associating the first load instruction with the first load data.

7. The method of claim 1, further comprising executing a fourth instruction in the main processor in program order, based on committing the first load instruction, wherein the fourth instruction has a data dependency on the first load instruction.

8. The method of claim 1, wherein the coprocessor is a vector processor and the first load instruction is a vector load instruction.

9. A processing system comprising:
a main processor and a coprocessor, the main processor configured to:
identify a first load instruction to offload to the coprocessor;
commit the first load instruction in the main processor without receiving first load data for satisfying the first load instruction; and
offload processing of the first load instruction to the coprocessor,
wherein the main processor comprises a main register file and is configured to update a first register specified in the first load instruction in the main register file when the first load instruction is committed.

10. The processing system of claim 9, wherein the main processor is configured to update a program counter (PC) value of the main processor when the first load instruction is committed.

11. The processing system of claim 9, wherein the coprocessor is configured to:
access a memory hierarchy with a first load address for the first load instruction;
receive a first load data corresponding to the first load address from the memory hierarchy; and
associate the first load instruction with the first load data out of program order.

12. The processing system of claim 11, wherein the coprocessor comprises:
an in-order instruction buffer configured to store the first load instruction in program order in a first entry of an in-order instruction buffer; and
an out-of-order load data buffer configured to store the first load data received from the memory hierarchy in a first entry of an out-of-order load data buffer,
wherein association of the first load instruction with the first load data is based on a determination that the first entry of the load data buffer corresponding to the first entry of the load instruction buffer has been populated.

13. The processing system of claim 12, wherein:
the in-order instruction buffer is further configured to store a second load instruction offloaded from the main processor in a second entry of the in-order buffer, wherein the second load instruction is programmatically younger than the first load instruction; and
the out-of-order load data buffer is further configured to store the second load data in a second entry of the out-of-order load data buffer prior to storing the first load data in the first entry of the out-of-order load data buffer, based on receiving the second load data prior to receiving the first load data.

14. The processing system of claim 12, wherein
the in-order buffer is further configured to store a third instruction offloaded from the main processor in a third entry of the in-order buffer, wherein the third instruction has a data dependency on the first load instruction; and
the coprocessor is further configured to execute the third instruction based on the association of the first load instruction with the first load data.

15. The processing system of claim 9, wherein the main processor is further configured to execute a fourth instruction in program order, based on the committing of the first load instruction, wherein the fourth instruction has a data dependency on the first load instruction.

16. The processing system of claim 9, wherein the coprocessor is a vector processor and the first load instruction is a vector load instruction.

17. The processing system of claim 9, integrated in a device, selected from the group consisting of a set top box, music player, video player, entertainment unit, navigation device, communications device, personal digital assistant (PDA), fixed location data unit, and a computer.

18. A non-transitory computer-readable storage medium comprising instructions executable by a processor, the processor in communication with a coprocessor, the non-transitory computer-readable storage medium comprising:
a first load instruction comprising a processor part and a coprocessor part, wherein the processor part is executable by the processor, such that the first load instruction is committed in the processor upon execution of the processor part, without receiving, by the processor, first load data for satisfying the first load instruction, wherein committing the first load instruction comprises completing a main processor part of the first load instruction by updating a first register specified in the first load instruction, in a main register file in the main processor; and
the coprocessor part is executable by the coprocessor, such that the coprocessor part is executed in the coprocessor after the first load instruction is committed in the processor.

19. The non-transitory computer-readable storage medium of claim 18, wherein the processor part is a scalar instruction and the coprocessor part is a vector instruction.

* * * * *